United States Patent [19]
Solc

[11] 4,438,179
[45] Mar. 20, 1984

[54] RESIN PARTICLES WITH MAGNETIC PARTICLES BONDED TO SURFACE

[75] Inventor: Jitka Solc, Midland, Mich.

[73] Assignee: The Dow Chemical Company, Midland, Mich.

[21] Appl. No.: 345,305

[22] Filed: Feb. 3, 1982

[51] Int. Cl.[3] .............. B32B 5/16

[52] U.S. Cl. .............. 428/407; 428/692; 428/694; 428/900; 427/128; 427/205; 427/214; 427/222; 252/62.54

[58] Field of Search .............. 427/214, 128, 205, 214, 427/222; 428/407, 692, 900, 694; 252/62.54

[56] References Cited

U.S. PATENT DOCUMENTS

| | | | |
|---|---|---|---|
| 3,175,935 | 3/1965 | Vanstrum | 428/407 |
| 3,672,945 | 6/1972 | Taylor | 427/214 |
| 3,698,931 | 10/1972 | Horowitz | 8/94.21 |
| 4,128,674 | 12/1978 | Hedler | 428/407 |
| 4,169,804 | 10/1979 | Yapel, Jr. | 252/62.53 |
| 4,170,685 | 10/1979 | Rembaum et al. | 428/407 |
| 4,198,307 | 4/1980 | Berkowitz et al. | 252/62.53 |
| 4,267,247 | 5/1981 | Ziolo et al. | 428/407 |

*Primary Examiner*—George F. Lesmes
*Assistant Examiner*—P. R. Schwartz
*Attorney, Agent, or Firm*—R. B. Ingraham

[57] ABSTRACT

Plastic particles having diameters of from about 1 to about 150 microns, a polymeric bonding layer on the surface thereof, are coated with magnetic particles to provide a generally uniform coating having a thickness of from about 0.05 to about 0.8 of a micron.

2 Claims, No Drawings

RESIN PARTICLES WITH MAGNETIC PARTICLES BONDED TO SURFACE

Ferromagnetic metals, such as iron, cobalt, nickel and the like and ferromagnetic substances such as magnetic iron oxide, ferrites of cobalt, zinc and similar metals are frequently used in powder form for a variety of applications. One such application is in pigments and fillers in paint and paint related systems. Such materials are also useful for the preparation of cores for electric and electronic applications as well as parasitic oscillation prevention. Generally, the particle size of such materials in powdered form is frequently from 1 to several microns in diameter. Such magnetic particles generally have one outstanding characteristic in common, and that characteristic is a high density which for many applications is undesirable. Generally, for applications involving electromagnetic radiation, in the mega and gigahertz regions, only the surface or skin layer of the particle is involved. Similarly, with applications such as corrosion resistance, shielding and the like, only the skin of the particle is functional, leaving the particle core essentially inactive and providing nothing but excessive weight of the product.

It would be desirable if there were available an improved magnetic particle of lower density.

It would also be desirable if there were available a method for the preparation of magnetic particles of relatively low density.

These benefits and other advantages in accordance with the present invention are achieved in a plastic particle having a diameter of from about 1 to about 150 microns, the particle having bonded to the surface thereof, a magnetic layer.

Also contemplated within the scope of the present invention is a method for the preparation of a magnetic particle of low density, the method comprising providing a synthetic resinous particle having a bonding polymer coating on a surface thereof, bonding a plurality of magnetic particles to the surface of the synthetic resinous particle to thereby form a magnetic coating on the surface of the synthetic resinous particle.

Magnetic particles in accordance with the present invention beneficially comprise a synthetic resinous core portion, a hydrophilic bonding layer and a beneficially generally continuous magnetic layer formed by the flocculation of colloidally dispersed magnetic particles. Such particles may be either ferromagnetic or ferrimagnetic. The synthetic resin for forming a nucleus or core of the magnetic particles in accordance with the present invention can be any rigid, solid organic resin which is insoluble in and not swollen by polar solvents, particularly water or the monomer or the polymer used to form the bonding coating. The bonding coating must be inert in that it does not react with and destroy the magnetic colloid employed to form the other magnetic surface of the particles. Examples of suitable synthetic resins for a core include crosslinked polystyrene resins such as styrene divinylbenzene copolymers, polyethylene, polypropylene, polychlorotrifluoroethylene, polytetrafluoroethylene, polyesters, polyamides, polycarbonates, polyacrylates, and numerous other synthetic resins which are insoluble in and are not swollen by polar solvents. These resins may also contain ionic substituents such as sulfonate, hydroxyl, carboxyl to the extent that the presence of these substituents does not significantly affect the essential properties of the core resins previously described. The synthetic resinous cores generally are spherical in shape and have diameters ranging from about 1 micron to 100 microns, the size of the particles depending primarily on the intended end use. If the particles are to be incorporated into a paint or other coating which is applied as a thin layer, for example 5 mils, smaller particles will be chosen. If thicker articles are to be prepared, for example, a molding one-quarter inch in thickness, larger or smaller particles would be utilized depending on the amount of magnetic material desired in the molding. The synthetic resinous material employed to form the core of the granule may be film forming either at room temperature or at elevated temperatures. A bonding layer of water swellable polymer on the synthetic resinous particles can be formed by any known surface bonding technique, such as are generally described in U.S. Pat. No. 3,698,931, the teaching of which is herewith incorporated by reference thereto. Beneficially, the bonding layer is formed by irradiating a mixture of core particles and from about 0.05 to 0.5 parts based on the weight of core particles of a liquid hydrophilic monomer or polymer with a source of high intensity ionizing radiation such as gamma rays. Gamma ray irradiation is preferably carried out at about room temperature using a radiation rate of approximately 0.1 to 1 megarad per hour and a maximum dose of about 3 megarads. Very desirable results have been obtained by irradiating at about 0.1 to about 0.4 megarads per hour with a total dose of about 0.1 to 3 megarads. Generally, cationic coatings are best prepared using radiation rates in the higher range and anionic coatings require relatively high total doses of radiation, the optimum amount of radiation in each case varying inversely with the reactivity of the monomer or polymer used to form the coating.

The use of nonpenetrating radiation such as an accelerated electron beam to initiate polymerization requires a modified technique, for example, polymerization in shallow trays with a lower dose rate of about 0.005–0.02 megarads per pass with total dosage and other conditions generally as described above.

The surface-bonding process can be carried out successfully using either the hydrophilic monomer or a polymer thereof. A solvent for the hydrophilic monomer or polymer is preferably employed and polar solvents such as water, aqueous NaOH, methanol, ethanol, or aqueous alcohol are preferred. The proportion of coating reactant to core particles as defined above is calculated to produce a coated product where the swellable polymer coating amounts to about 0.01–10 percent by weight of the whole depending on the core particle size used.

The bonding layer can be one of two structurally different classes, both of which have the common property of binding magnetic particles to the plastic or synthetic resinous particles.

The first of these classes comprises polymers of polymerizable alpha-olefins having a functional group substituent which is either ionic in nature or capable of forming a metal chelate or complex. Examples of such groups include carboxyl, amino, quaternary ammonium, amido, carboxy ester groups and sulfonate. Thus, alpha-olefins under this definition include acrylic acid, methacrylic acid, acrylamide, aminoethyl, methacrylate, hydroxyethyl, acrylate, vinylbenzyl, trimethylammonium chloride, vinyl acetate, and other such monomers. Polar solvent soluble polymers of such monomers can also be bonded to the core particles as previously described.

The second class of polymer coatings of this invention are the water-soluble or methanol-soluble polyethylene glycols, polypropylene glycols, and mixed ethylene-propylene polyglycols. These are most effectively bonded to the core particles by irradiating a mixture of the core particles and a solution of the polyglycol.

Magnetic particles suitable for the preparation of particles in accordance with the present invention are any particulate material exhibiting paramagnetism, that is capable of being attracted by a magnet; such as, for example, iron and alloys thereof, iron oxide, nickel and alloys thereof, ferrites, magnatite and the like may be used. Generally, the useable particle size for such magnetic particles is from about 0.01 to about 0.5 microns and preferably from about 0.01 to about 0.2 microns. In general the larger magnetic particles being employed with the larger synthetic resinous particles. Generally, in order to obtain magnetic particles in accordance with the present invention, it is usually necessary only to admix a suspension of the synthetic resinous particles having the bonding layer formed thereon with a colloidal dispersion of magnetic particles and permit the mixture to remain at about room temperature for a period, for example, of 48 hours. The colloidal magnetic particles are attracted to the water swellable polymer on the surface of the synthetic resinous particle and are flocculated into a surprisingly uniform layer. If desired, the process can be accelerated by raising the temperature of the mixture of magnetic particles and synthetic resinous particles having the water swellable coating thereon. The maximum usable temperature depends on the particular stabilizing or emulsifying systems employed with any particular magnetic dispersion. Particles in accordance with the present invention are useful for the absorption of electromagnetic radiation, particularly radiation in the megahertz and gegahertz ranges. They are also useful for removing finely dispersed metals and metal ores from aqueous bodies.

The invention is further illustrated but not limited by the following example.

A styrene-divinylbenzene copolymer containing about 50% divinylbenzene, the remainder being styrene, and having a particles size in the range from 11 to 14 microns was cleaned to remove absorbed colloidal silica and other surface impurities. Cleaning was accomplished by repeated washing with hydrochloric acid and subsequent removal of the hydrochloric acid by washing with deionized water. The powder was then dried. A bonding layer was formed on the styrene divinylbenzene copolymer particles by admixing 120 grams of the styrene divinylbenzene particles with 80 milliliters of methyl alcohol and 30 milliliters of glacial acrylic acid. Oxygen was removed from the reaction mixture by means of a nitrogen purge and the reaction mixture maintained under a nitrogen atmosphere during irradiation at a dose rate of 0.175 megarad per hour for a period of 4 hours and a total dose of 0.7 megarad. Nongrafted polyacrylic acid formed simultaneously with the bonding polymer attached to the styrene divinylbenzene particles was removed by suspending the particles in a 0.1 normal sodium hydroxide solution and decanting six times. The particles were subsequently washed with methanol and deionized water. On titration, the resultant polymer particles had about 40 milliequivalents of carboxyl groups per gram. the styrene divinylbenzene polymer having a polyacrylic acid surface was admixed with 150 grams of an aqueous dispersion of magnetic iron oxide (Ferrofluid A-01) which was about 6 weight percent solids. The admixture was aged for about 48 hours at room temperature, filtered and dried at room temperature. Electron micrographs of the material showed a generally uniform layer of magnetic iron oxide on the surface of the styrene divinylbenzene beads. The thickness varied between about 0.2 and 0.3 of a micron and the product shows a strong response to magnetic fields. The particles had a density of 2.16 grams per cubic centimeter.

In a manner similar to the foregoing, a wide variety of plastic core magnetically coated particles may be prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A synthetic resinous particle having a diameter of from about 1–150 microns, the particle having bonded to the surface thereof a coating comprising a magnetic layer, the magnetic layer being of flocculated magnetic particles being bonded to the surface thereof, the bonding layer comprising a water swellable polymer grafted to the surface of the particle.

2. A synthetic resinous particle having a diameter of from about 1 to 150 microns, the particle having a bonding layer of a water swellable polymer grafted to the surface of the particle, the bonding layer bonding a layer of flocculated colloidal magnetic iron oxide particles to thereby form a magnetic layer on the surface of the particle.

* * * * *